United States Patent [19]
Collins

[11] Patent Number: 4,586,551
[45] Date of Patent: May 6, 1986

[54] CENTERPOST DRIVE FOR A TIRE CHANGING MACHINE

[75] Inventor: Curran N. Collins, Goshen, Ohio

[73] Assignee: Big Four Equipment, Inc., Maineville, Ohio

[21] Appl. No.: 721,299

[22] Filed: Apr. 9, 1985

[51] Int. Cl.$^4$ .............................................. B60C 25/08
[52] U.S. Cl. ................................................ 157/1.24
[58] Field of Search ................... 157/1.17, 1.22, 1.24, 157/1.28

[56] References Cited

U.S. PATENT DOCUMENTS

| | | |
|---|---|---|
| 910,013 | 1/1909 | Noesen . |
| 987,939 | 3/1911 | Anderson . |
| 1,274,345 | 7/1918 | Sterling . |
| 2,374,714 | 5/1945 | Turchan et al. . |
| 2,853,102 | 9/1958 | Walker . |
| 2,868,176 | 1/1959 | Bennett . |
| 2,920,664 | 1/1960 | Lomen et al. . |
| 2,926,697 | 3/1960 | Baker et al. . |
| 2,945,522 | 7/1960 | Nelson . |
| 3,042,090 | 7/1962 | Foster . |
| 3,219,077 | 11/1965 | Wright . |
| 3,554,262 | 1/1971 | Swanson . |
| 3,688,798 | 9/1972 | Nightingale et al. . |
| 3,722,570 | 3/1973 | McKenney . |
| 3,847,198 | 11/1974 | Brosene, Jr. ........................ 157/1.24 |
| 4,031,918 | 6/1977 | Cagle . |

*Primary Examiner*—James G. Smith
*Attorney, Agent, or Firm*—Wood, Herron & Evans

[57] ABSTRACT

A drive assembly for sequentially driving two or more fluid motors which are adapted to rotate the centerpost shaft of a tire changing machine includes a spool valve controller supplied with operating fluid from a four-way valve. The spool valve controller comprises a valve spool rotatable within a valve body having axially spaced sets of ports which are interconnected by flow passages formed in the exterior wall of the valve spool. The spool valve controller is operable to direct operating fluid from the four-way valve to selected ports in the valve body, which, in turn, are connected with lines to the fluid motors. The operation of the spool valve controller is timed to operate the fluid motors in sequence so as to produce a continuous high torque output of the centerpost shaft with no dead spots. Rotation of the centerpost in both the clockwise and counter-clockwise directions is controlled by the four-way valve.

14 Claims, 9 Drawing Figures

CENTERPOST DRIVE FOR A TIRE CHANGING MACHINE

BACKGROUND OF THE INVENTION

This invention relates to drive assemblies, and, more particularly, to a drive assembly for rotating the centerpost of a power tire changing machine.

The majority of tires used on passenger cars and light trucks are of the tubeless type which are mounted on wheels having opposed outer rim flanges located adjacent upper and lower bead seats which lead to an inner annular area, usually of the drop center type. The sidewalls of the tire each terminate in an annular section or bead which are adapted to seat within the upper and lower bead seats of the wheel. The tire beads sealingly engage the bead seats of the wheel to prevent leakage of air and dislocation of the tire from the wheel.

Tire mounting and demounting machines have been in use for several decades for the removal of tubeless tires from a wheel. In demounting a tire from a wheel, the tire and wheel are first placed on the tire changing machine over a centerpost and then clamped to the support table of the machine in an essentially horizontal position. The outer face or sidewall of the tire faces upwardly so that its valve core may be removed to enable the air pressure within the tire to drop to about atmospheric level.

The next step in removing the tire from the wheel is to force both the upper and lower tire beads off of their bead seats on the wheel toward the inner drop center of the wheel. Most tire changing machines in commercial use today employ upper and lower bead breaking shoes which engage the beads on opposite sides of the tire and are forced inwardly to push the tire beads off of their bead seats. At this point in the demounting operation, the beads on both sides of the tire are displaced from the bead seats of the wheel and are positioned near the center of the wheel.

The final step in the demounting process is to force at least one bead and sidewall of the tire over the outer flange of the wheel. This is accomplished with a wedge or prying tool which is operatively mounted atop the rotatable centerpost shaft of the tire changing machine. The prying tool is formed with a slotted end adapted to fit over a flattened portion at the top of the centerpost shaft. The other end of the tool extends downwardly from the top of the centerpost shaft over the outer flange of the wheel and beneath the upwardly facing bead of the tire. The prying tool is rotatable with the centerpost shaft along the outer rim of the wheel and forces the tire bead over the outer rim as it rotates.

In prior tire changing machines, the centerpost shaft is usually rotated by a single fluid motor such as a pneumatic or hydraulic cylinder having a reciprocating piston. When the cylinder is actuated by air or liquid, the piston is extended and retracted to rotate the centerpost shaft, and, in turn, the prying tool. In some machines, actuation of the cylinder through a complete cycle, in which the piston is moved from a fully retracted to a fully extended position, results in rotation of the centerpost shaft through an angle ranging from about 270° to 315°. In such machines, the prying tool is removed after one cycle so that the cylinder may be retracted in preparation for another demounting operation. Other machines do not recycle but utilize cylinders which develop power upon both extension and retraction of the piston. These machines, however, are also limited to rotation of the centerpost shaft between 270° and 315° both during full extension and retraction of the piston.

Several problems have resulted from the use of centerpost drive assemblies of the type described above. In many tire demounting operations, particularly with tires of larger diameter, a substantial torque is required to rotate the centerpost so that the prying tool can urge the tire bead and sidewall above the outer flange of the wheel. A standard size pneumatic or hydraulic cylinder may be incapable of providing sufficient torque for some applications. While the problem of insufficient torque can be avoided by employing a very large cylinder, this solution adds substantially to the expense and size of the tire changing machine.

Another disadvantage of the centerpost shaft drives of prior art tire changing machines is that they do not rotate the centerpost shaft beyond 270° to 315°, and also are not reversible to permit rotation of the centerpost both in a clockwise and counterclockwise direction. As mentioned above, in most prior art centerpost drives a complete cycle of operation of the cylinder results in rotation of the centerpost through a maximum angle of only about 270° to 315°. If the tire bead has not been pryed above the outer flange of the wheel by the time the centerpost shaft has completed its rotation, the pry bar must be removed and the cylinder recycled. Often, in order to remove the pry bar, which is wedged between the tire bead and wheel, a hammer or other tool must be used to forcefully release the tool from beneath the tire bead. Since prior art centerpost shaft drives permit rotation of the centerpost in only one direction, jamming of the pry bar cannot be overcome by reversing the direction of rotation of the centerpost.

SUMMARY OF THE INVENTION

It is therefore among the objects of this invention to provide a drive assembly for a shaft, and in particular for the centerpost of a tire changing machine, which generates high torque, which has no dead spots or areas in the operative cycle in which the torque is insufficient to rotate the shaft under load, which continuously rotates the centerpost and which is reversible for rotating the centerpost both in clockwise and counterclockwise direction.

These objects are accomplished in a drive assembly according to a presently preferred embodiment of this invention in which a spool valve controller supplied with fluid by a four-way valve is operable to actuate two or more fluid motors which are adapted to rotate the centerpost of a tire changing machine. The spool valve controller is a rotary actuated spool valve which supplies operating fluid to the fluid motors in a timed sequence so that their pistons which rotate the centerpost shaft are driven at a 90° interval. The sequential operation of the fluid motors produces high torque throughout continuous rotation of the centerpost shaft to assure removal of the tire bead from the wheel. The four-way valve which supplies operating fluid to the spool valve controller permits reversal of the direction of movement of the pistons of the fluid motors so that the centerpost is rotatable in both a clockwise and counterclockwise direction.

More specifically, a presently preferred embodiment of this invention includes two pneumatic cylinders each having reciprocating pistons which are operatively connected by crank arms to a crank shaft, which, in turn, is adapted to rotate the centerpost shaft through gears, belts, chains or similar driving connections. The operation of the cylinders is controlled by a spool valve which comprises a hollow valve body and a valve spool rotatable within the valve body. The valve body is formed with an upper set of circumferentially spaced ports; and a lower set of circumferentially spaced ports disposed axially beneath the upper set along the valve body. Preferably, the ports in the upper set circumferentially align with the ports in the lower set. The exterior wall of the valve spool is formed with spaced, upper grooves which form flow passages adapted to interconnect the ports in the upper set. Spaced axially below the upper grooves in the exterior surface of the valve spool are lower grooves which form flow passages adapted to interconnect the ports in the lower set.

The supply of operating fluid to the spool valve is controlled by a four-way valve. The operating fluid is directed from the spool valve to the back and front ends of two pneumatic cylinders by a number of fluid lines. As explained in detail below, the valve spool is operatively connected to the crank shaft and centerpost shaft so that it is rotatable within the valve body in timed sequence with the rotation of the crank shaft. As the valve spool rotates, the upper and lower grooves in its exterior surface alternately interconnect and block different ports in the upper and lower sets of ports to selectively direct the flow of fluid supplied by the four-way valve to the back or front of the cylinder so as to extend or retract, respectively, the piston of each cylinder.

Preferably, the lower grooves in the valve spool are circumferentially spaced from the upper grooves by approximately 45° when the crank shaft is driven by two cylinders operating 90° apart. In addition, the valve spool is operatively connected to the crank shaft so that the valve spool is rotated within the valve body one revolution for every two revolutions of the crank shaft. As described in detail below, the circumferential spacing of the grooves in the valve spool, combined with the ratio of two revolutions of the crank shaft for every one revolution of the valve spool, results in a sequential operation of the pneumatic cylinders to produce a high torque output. The pneumatic cylinders are driven such that their crank arms which drive the crank shaft are always 90° apart during continuous rotation of the centerpost shaft in either the clockwise or counterclockwise direction.

The drive assembly of this invention provides several improvements over the centerpost drive of prior art tire changing machines. The use of two pneumatic cylinders, sequentially driven at a 90° interval by a valve spool controller, provides a drive for the centerpost shaft which produces high torque and continuous rotation. In addition, the provision of a four-way valve for supplying operating fluid to the spool valve permits a reversal in the movement of the cylinder pistons so as to permit rotation of the centerpost both in the clockwise and counterclockwise direction. This is valuable in correcting any jamming of the pry bar which may occur during a demounting operation without requiring it to be forceably removed with hand tools.

DESCRIPTION OF THE DRAWINGS

The structure, operation and advantages of a presently preferred embodiment of this invention will become further apparent upon consideration of the following description taken in conjunction with the accompanying drawings wherein.

DETAILED DESCRIPTION OF THE INVENTION

Figure 1:
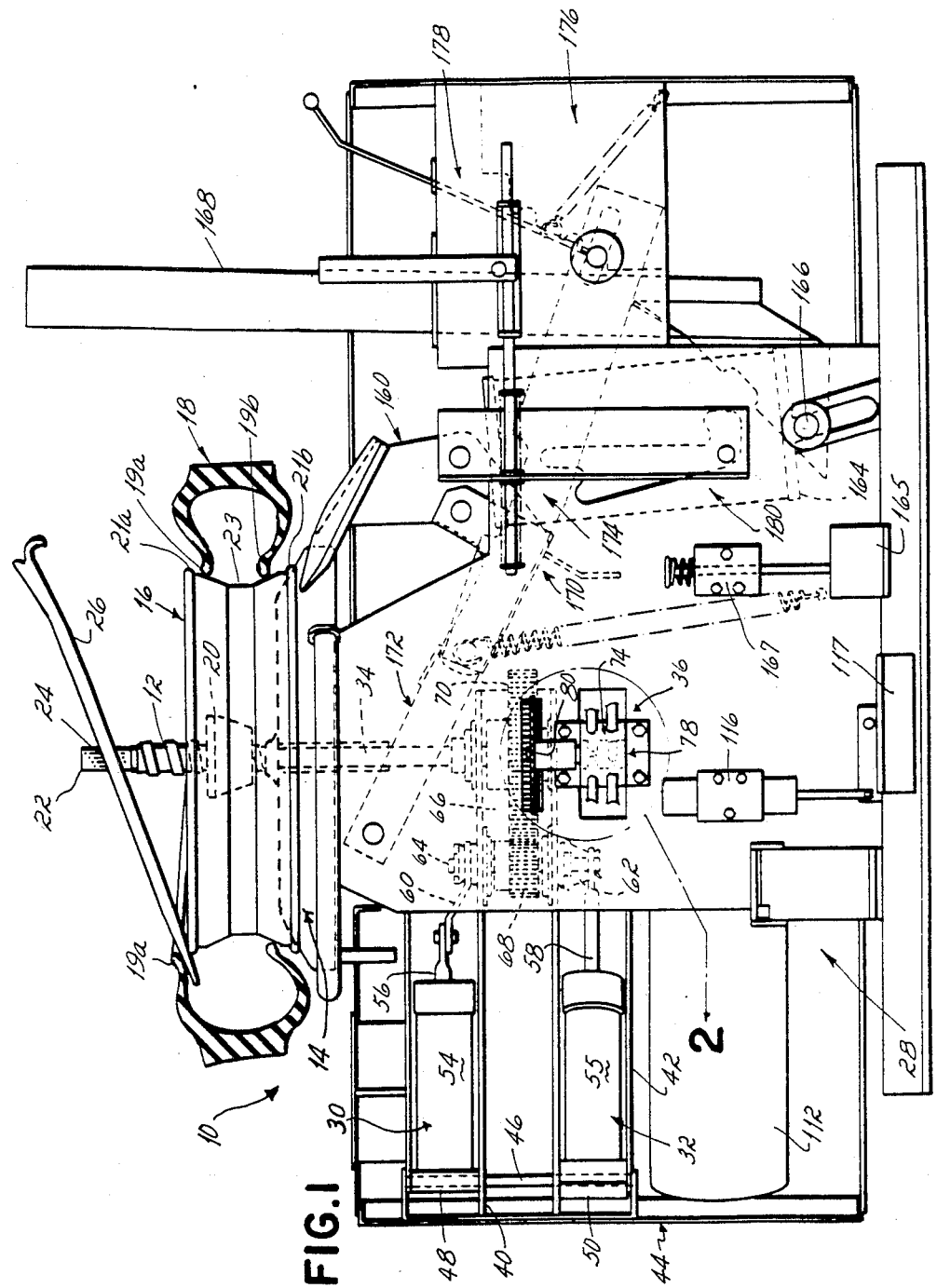
FIG. 1 a front view of a tire changing machine which is partially broken away to illustrate schematically the centerpost drive assembly of this invention.

Referring to FIG. 1, a schematic view of a power tire changing machine 10 is illustrated. The machine 10 includes a fixed centerpost 12 which extends through a horizontal platform 14 on which the wheel 16 and tire 18 are mounted for demounting of the tire 18 from the wheel 16. A cone 20 is threaded along the centerpost 12 and into engagement with the wheel 16 to secure the wheel 16 and tire 18 in place on the platform 14.

The tire 18 includes beads 19a, b which seat against the bead seats 21a, b, respectively, of the wheel 16 with the tire 18 fully inflated. When the beads 19a, b are broken from their seats 21a, b, as shown in FIG. 1 and discussed below, the beads 19a, b extend near the annular center 23 of the wheel 18. A rotatable centerpost shaft 34 extends through the upper end of the centerpost 12 and is formed with a flat 22 at the top which is insertable through a slot 24 formed near the middle of a pry bar 26. The pry bar 26 is adapted to extend from the flat 22 over the outer rim of the wheel 16 and beneath the upper bead 19a of the tire 18. To complete the demounting operation, the centerpost shaft 34 is rotated, which, in turn, rotates the pry bar 26 along the circumference of the wheel 16 to force tire bead 19a above the wheel 16. The process is then repeated to remove the lower tire bead 19b so that the tire 18 may be removed from the wheel 16.

Referring to the left hand portion of FIG. 1, a presently preferred embodiment of the drive assembly 28 of this invention for rotating the centerpost shaft 34 is illustrated. The centerpost drive assembly 28 includes upper and lower pneumatic cylinders 30, 32 operatively connected to the centerpost shaft 34. A spool valve controller 36 is adapted to direct operating fluid supplied by a four-way valve 116 to the upper and lower cylinders 30, 32 such that the cylinders 30, 32 are driven sequentially to continuously rotate the centerpost shaft 34. The centerpost drive assembly 28 produces high torque output throughout the 360° rotation of shaft 34, and is reversible to rotate shaft 34 in a clockwise and counterclockwise direction.

The upper and lower cylinders 30, 32 are mounted to horizontal platforms 40, 42, respectively, which are bolted or welded to the frame 11 of the machine 10. The platforms 40, 42 support a shroud 44 as illustrated at the left-side side of FIG. 1. A rod 46 extends between the platforms 40, 42 which is received in sleeves 48, 50 formed in the rearward end of each of the upper and lower cylinders 30, 32, respectively. The upper and lower cylinders 30, 32 are rotatable about rod 46 and slide along the horizontal platforms 40, 42 when actuated by spool valve controller 36.

The upper and lower cylinders 30, 32 are each formed with a cylinder housing 54, 55, respectively, within which a piston 56, 58 is mounted for reciprocal movement. The outermost ends of pistons 56, 58 are pinned to crank arms 60, 62, respectively, whose opposite ends are connected to a rotatable crank shaft 64 journalled to a support 66. As described in more detail below, the cylinder pistons 56, 58 are reciprocated so that their crank arms 60, 62, respectively, continuously rotate crank shaft 64. Although pneumatic cylinders 30, 32 are illustrated in the drawings, it is contemplated that other types of fluid motors such as hydraulic or steam driven cylinders could be utilized for the centerpost drive assembly 28 herein.

Rotation of the crank shaft 64 by cylinders 30, 32 is transmitted to the centerpost shaft 34 by a drive gear 68 mounted to the crank shaft 64, and a follower gear 70 mounted to the centerpost shaft 34 which meshes with drive gear 68. It is also contemplated that the crank arms 60, 62 of cylinders 30, 32, respectively, could be directly connected to the centerpost shaft 34 for rotation thereof. In that design, the drive gear 68 could be eliminated.

Figure 2:
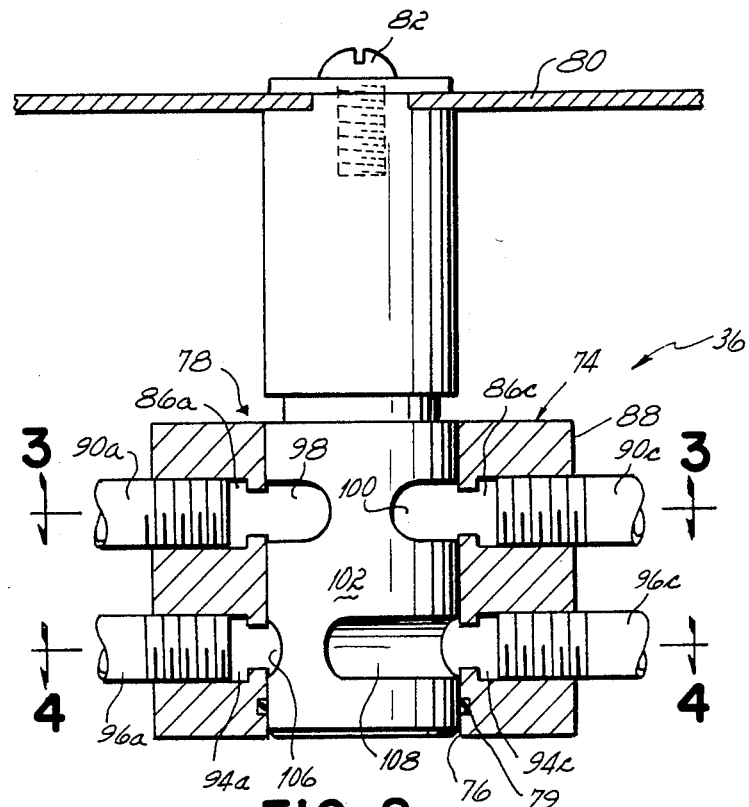
FIG. 2 is an enlarged view in partial cross section of the valve spool controller for the drive assembly herein.
Figure 3:
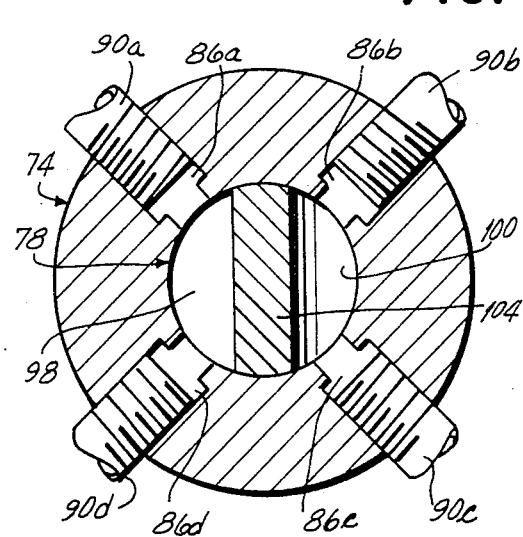
FIG. 3 is a cross sectional view taken generally along line 3—3 of FIG. 2 showing the upper set of ports in the valve body and the upper grooves formed on the exterior wall of the valve spool.
Figure 4:
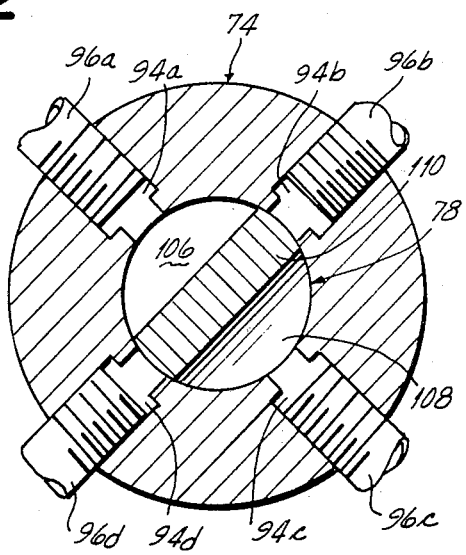
FIG. 4 is a cross sectional view taken generally along line 4—4 of FIG. 2 showing the lower set of ports in the valve body and the lower grooves formed in the exterior wall of the valve spool.

Referring now to FIGS. 2-4, the spool valve controller 36 for controlling the operation of upper and lower cylinders 30, 32 is shown. Controller 36 includes a valve body 74 having a central throughbore 76 in which a valve spool 78 is rotatable received. In a presently preferred embodiment, an O-ring 79 is provided at the base of valve spool 78 to seal it with respect to the valve body 74. An O-ring could also be provided at the top of valve spool 78, if desired. A spool drive gear 80 is mounted atop the valve spool 78 by a screw 82 and integral key for purposes to become apparent below.

The valve body 74 includes an upper set of ports 86a-d which extend radially inwardly from the exterior surface 88 of valve body 74 to its central throughbore 76. Preferably, the ports 86a-d are spaced 90° apart about the circumference of the valve body 74. Each of the ports 86a-d is adapted to threadedly receive a fitting 90a-d, respectively. The valve body 74 is also formed with a lower set of ports 94a-d which are disposed axially below the upper ports 86a-d, and extend radially inwardly from the exterior surface 88 of valve body 74 to its central throughbore 76. Preferably, the ports 94a-d are spaced 90° apart about the circumference of valve body 74 in alignment with the ports 86a-d, respectively. Each of the ports 94a-d threadedly receive a fitting 96a-d, respectively.

As best shown in FIG. 3, the valve spool 78 is formed with a pair of upper grooves 98, 100 which extend radially inwardly from the exterior surface 102 of valve spool 78 toward the center forming a continuous, center section 104 therebetween. The valve spool 78 is preferably a lapped spool design which permits essentially no leakage between the center section 104 and the valve body 74. As shown in FIG. 3, the upper grooves 98, 100 are half moon in shape and extend along essentially the entire diameter of valve spool 78 on either side of center section 104. The upper grooves 98, 100 form flow passages for operating fluid which interconnect the upper ports 86a-d. For example, in the position of valve spool 78 shown in FIG. 3, upper groove 98 forms a fluid flow passage between ports 86a and 86d, and upper groove 100 forms a fluid flow passage between ports 86c and 86b.

Spaced axially below the upper grooves 98, 100 are a pair of lower grooves 106, 108 which extend radially inwardly from the exterior surface 102 of valve spool 78 toward its center forming a continuous, center section 110 therebetween. As shown in FIG. 4, the lower grooves 106, 108 and lower center section 110 are formed in essentially the same shape as upper grooves 98, 100 and upper center section 104. In a presently preferred embodiment of this invention, the lower grooves 106, 108 are spaced 45° along the circumference of valve spool 78 from upper grooves 98, 100. The lower center section 110 is also circumferentially spaced 45° from the upper center section 104 along the exterior surface 102 of valve spool 78. The lower grooves 106, 108 form flow passages for operating fluid which interconnects the lower ports 94a-d. As explained in more detail below, the spaced relationship of upper ports 86a-d and lower ports 94a-d along the exterior surface 102 of valve spool 78 results, in part, in the sequential operation of upper and lower cylinders 30, 32 for driving centerpost shaft 34.

Referring now to FIGS. 1 and 5-9, the flow of operating fluid to spool valve controller 36, and from spool valve controller 36 to cylinders 30, 32, is illustrated. A fluid line connects standard shop air lines to a commercially available four-way valve 116 which is operated by a foot treadle 117. In turn, the four-way valve 116 supplies air to spool valve controller 36.

Figure 5:
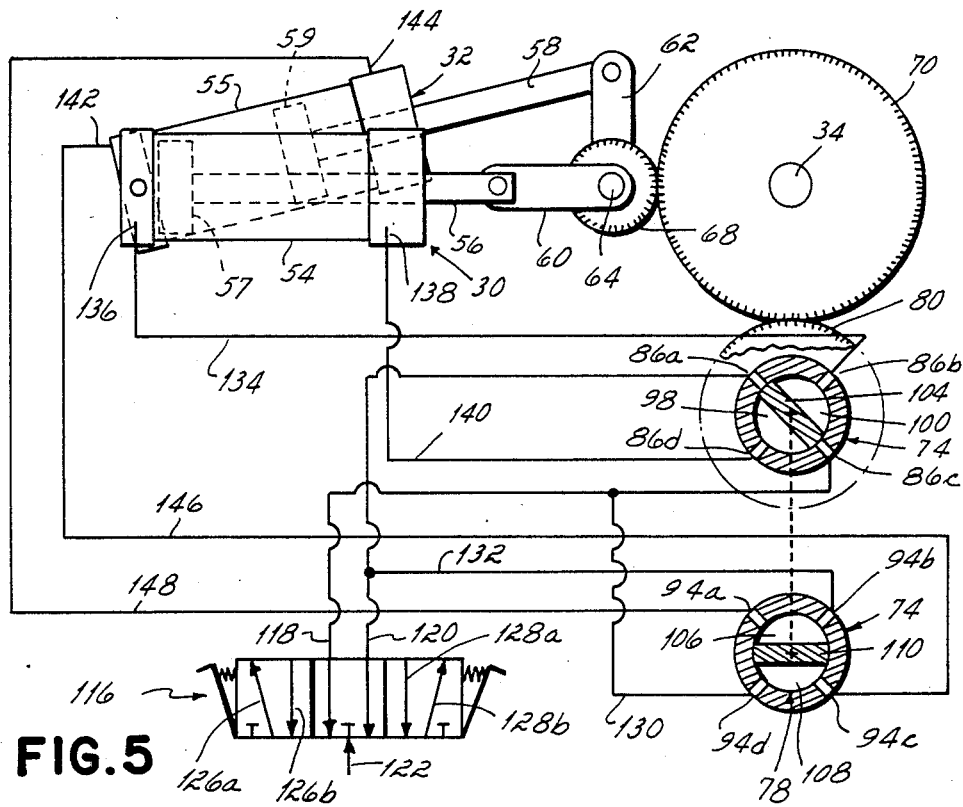
FIG. 5 is a schematic plan view of the drive assembly herein with a crank arm in the 0°/360° position.

The four-way valve 116 includes two fixed exhaust lines 118, 120, a pressure line 122 operated by foot treadle 117 and movable counterclockwise control lines 126a, b and clockwise control lines 128a, b both of which are spring loaded. For purposes of the present discussion, the terms "clockwise" and "counterclockwise" refer to the direction of rotation of the centerpost shaft 34. As is well known, the four-way valve 116 operates by depressing the foot treadle 117 so that either the counterclockwise control lines 126a, b or clockwise control lines 128a, b are operatively connected between the pressure line 122 and exhaust lines 118, 120 of the four-way valve 116. For example, by depressing one side of the foot treadle 117 the counterclockwise control lines 126 a, b are shifted to the right as shown in FIG. 5, so that the pressure line 122 is connected to exhaust line 118 by control line 126a making it a pressure line, and the exhaust line 120 is retained as an exhaust line for the discharge of air through its connection to control line 126b. The reverse is true when activating clockwise control lines 128a, b wherein the control lines 128a, b are shifted to the left and the exhaust line 120 is connected to the pressure line 122 via control line 128a. The air is exhausted from valve 116 through exhaust line 118 which is connected to control line 128b.

Referring to the schematic drawing of FIG. 5, the connections for directing operating fluid between four-way valve 116 and spool valve controller 36, and between the spool valve controller 36 and cylinders 30, 32, are illustrated. The upper set of ports 86a–d in valve body 74, in combination with upper grooves 98, 100 in valve spool 78, control the operation of upper cylinder 30. The lower ports 94a–d formed in valve body 74, in combination with lower grooves 106, 108 in valve spool 78, control the operation of lower cylinder 32. For ease of illustration and comprehension, the upper ports 86a–d and upper grooves 98, 100 of valve spool 78 are shown in plan view above the lower ports 94a–d and lower grooves 106, 108, which are also shown in plan.

Referring now to FIG. 5, fluid line 118 connects directly to upper port 86c. A secondary fluid line 130 connects line 118 with lower port 94d. Fluid line 120 is directly connected to upper port 86a and a connector line 132 extends between fluid line 120 and lower port 94b. As described in more detail below, lines 118, 130 provide the fluid air inlet lines to spool valve controller 36 with the four-way valve 116 set for counterclockwise motion. Lines 120, 132 form the air inlet lines to spool valve controller 36 with the four-way valve 116 set for clockwise rotation.

The remaining upper ports 86b, d and lower ports 94a, c direct pressurizing air to the upper and lower cylinders 30, 32 and remove exhaust air therefrom. Considering first the upper cylinder 30, upper port 86b is connected by a line 134 to a port 136 in the rearward end of upper cylinder 30. A port 138 formed in the forward end of upper cylinder 30 is connected to upper port 86d by a fluid line 140. Pressurized air supplied to the upper cylinder 30 through fluid line 134 acts against the piston head 57 to force piston 56 outwardly from its housing 54. Conversely, pressurized air supplied through line 140 to the front port 138 of upper cylinder 30 causes its piston 56 to retract within housing 54.

As shown in FIG. 5, the lower cylinder 32 is formed with a rearward port 142 and a forward port 144. The rearward port 142 is connected by fluid line 146 to lower port 94c formed in the valve body 74. Lower port 94a is connected by a fluid line 148 to the forward port 144 of lower cylinder 32. The piston 58 having piston head 59 is reciprocated inwardly and outwardly from its housing 55 by alternately pressurizing lines 148 and 146, respectively.

An important advantage of this invention is the provision of a high torque output from upper and lower cylinders 30, 32 to insure continuous rotation of the centerpost shaft 34 to avoid jamming of the pry bar 26. In order to produce a high torque output, the upper and lower cylinders 30, 32 are operated in sequence wherein their pistons 56, 58, respectively, are extended and retracted at timed intervals. This is accomplished by the configuration of the valve spool 78 described above, in combination with a gearing arrangement between the drive gear 68 mounted to the crank shaft 64 and the spool drive gear 80 mounted to the valve spool 78.

As best shown in FIGS. 1 and 5, the drive gear 68 meshes with follower gear 70 which is mounted to centerpost shaft 34. In turn, the follower gear 70 meshes with the spool drive gear 80 so that the follower gear 70 and spool drive gear 80 rotate with the drive gear 68. The spool drive gear 80 rotates the valve spool 74 within the valve body 78. In a presently preferred embodiment of this invention, the diameter of drive gear 68 is one-half the diameter of spool drive gear 80. Therefore, two revolutions of drive gear 68 are required to rotate the spool drive gear 80, and in turn valve spool 78, through a single revolution.

As will become more apparent below in discussing the operation of spool valve controller 36 shown in FIGS. 5–9, the ratio of two revolutions of drive gear 68 for every one revolution of valve spool 78 is important to the proper timing of cylinders 30, 32. The cylinders 30, 32 are "properly timed" when operating air is continuously supplied by the valve spool 78 to the rearward ports 136, 142 of the cylinders 30, 32 to obtain full extension of their pistons 56, 58. Once the pistons 56, 58 have reached full extension, the spool valve controller 36 then directs the flow of operating air to the forward ports 138, 144 for retraction of the pistons 56, 58.

The cylinder pistons 56, 58 are fully extended or retracted every 180° of rotation of the drive gear 68. As explained more fully below, since the ports 86a–d and 94c–d along valve body 74 are spaced 90° apart, valve spool 74 must be rotated 90° for every 180° of rotation of drive gear 68 to supply operating air to either the forward or rearward ports of cylinders 30, 32 to achieve complete extension or retraction of their pistons 56, 58.

The operation of cylinders 30, 32 is also timed so that their pistons 56, 58 are driven at a 90° interval. The 2:1 ratio in the rotation of the drive gear 68 relative to the spool drive gear 80, in combination with the 45° circumferential spacing between the upper grooves 98, 100 and lower grooves 106, 108, causes operating air to be directed to the upper cylinder 30 and lower cylinder 32 such that the cylinders 30, 32 are driven 90° apart relative to drive gear 68. In other words, as shown in FIG. 5, the piston 56 of upper cylinder 30 is driven such that its crank arm 60 connected to drive gear 68 is disposed at a 90° angle to the crank arm 62 driven by the piston 58 of lower cylinder 32. The crank arms 60, 62 retain their 90° spacing relative to one another throughout a complete 360° rotation of drive gear 68 and spool drive gear 80.

OPERATION

Referring now to FIGS. 5–9, the operation of centerpost drive assembly 28 in rotating the centerpost shaft 34 is illustrated. For ease of illustration and discussion, the operation of cylinders 30, 32 and spool valve controller 36 are shown at 45° intervals in the movement of the upper cylinder crank arm 60, and drive gear 68, beginning with the 0°/360° position shown in FIG. 5 wherein the crank arm 60 is coincident with a horizontal axis passing through drive gear 68, and continuing at 45° intervals to the position in FIG. 9 wherein the crank arm 60 is spaced 180° from its initial position. For continuous rotation of centerpost shaft 34 in the clockwise direction, the cylinders 30, 32 and controller 36 are driven through a sequence of operation beginning at the 0°/360° position and moving though a descending order of angular positions of crank arm 60, i.e. 315°, 270° and so on. Continuous rotation of centerpost shaft 34 in the counterclockwise direction requires the cylinders 30, 32 and controller 36 to be driven through an ascending order of angular positions of crank arm 60 beginning at the 0°/360° start position and moving through 45°, 90°, 135° and upwardly. The operation of centerpost drive assembly 28 for driving centerpost shaft 34 in a counterclockwise direction will thus be considered by referring to FIGS. 5–9 which depict the 0°/360°, 45°, 90°, 135° and 180° angular positions of crank arm 60. Clockwise rotation of centerpost shaft 34 by centerpost drive assembly 28 will then be discussed considering FIGS. 9–5 in descending sequence.

Considering first the counterclockwise rotation of centerpost shaft 34, and referring to FIG. 5, the four-way valve 116 is activated by depressing foot treadle 117 so that the counterclockwise control line 126a connects pressure line 122 to line 118, and control line 126b connects to line 120 to provide an operating fluid exhaust. Air flows through line 118 to top port 86c and through line 130 to bottom port 94d. In the 0°/360° position, the upper center section 104 blocks upper ports 86a, c and is disposed between upper ports 86b, d. Therefore, no flow of air is permitted through the upper set of ports 86a-d to drive upper cylinder 30. In addition, in the 0°/360° position, the upper cylinder piston 56 is fully retracted.

In the same 0°/360° start position, the lower center section 110 of valve spool 78 is oriented so as to align lower groove 106 with lower ports 94a, b, and lower groove 108 with lower ports 94c, d. The flow of air from pressure line 118 through line 130 therefore passes from port 94d to 94c, through line 146 to the rearward port 142 of lower cylinder 32. This causes the lower cylinder piston 58 to move outwardly from its housing 55 which rotates the drive gear 68 in the clockwise direction. Clockwise rotation of drive gear 68 causes follower gear 70 and centerpost shaft 34 to rotate in a counterclockwise direction which, in turn, rotates the valve spool 78 in a clockwise direction. Air is exhausted from the front port 144 of lower cylinder 32 through line 148, ports 94a, b, line 132 and then line 120 to the four-way valve 116.

Figure 6:
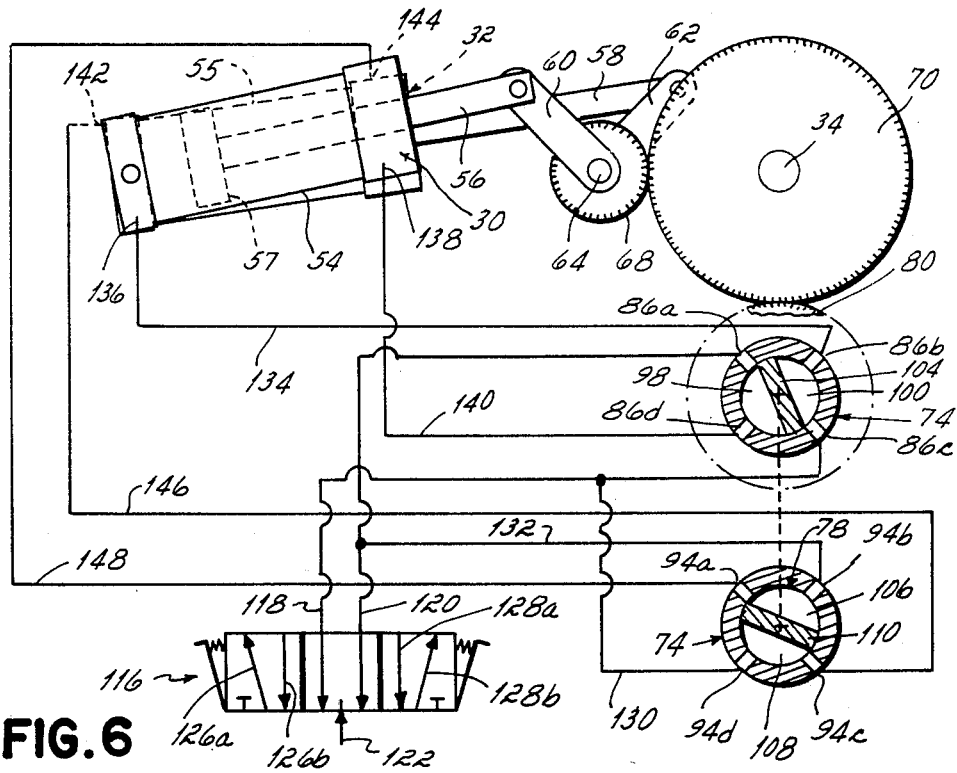
FIG. 6 is a schematic plan view similar to FIG. 5 in which the crank arm has rotated to 45° from its position in FIG. 5.

Referring now to FIG. 6, a second position is shown wherein the valve spool 78 has been rotated 22 ½° in a clockwise direction in response to a 45° clockwise movement of the crank arm 60 from its 0°/360° position. In this position, the upper center section 104 no longer blocks any of the upper ports 86a-d. Air flows through pressure line 118 to upper port 86c, through upper groove 100 and into port 86b. The air then travels through line 134 to the rearward port 136 of upper cylinder 30 so that its piston 56 is urged outwardly which rotates drive gear 68 in the clockwise direction and follower gear 70 in the counterclockwise direction. Air is exhausted from upper cylinder 30 through front port 138, line 140, through ports 86d, a and then through line 120 to the four-way valve 116.

The flow of air through lower ports 94a-d in spool valve controller 36 to operate lower cylinder 32 is identical to that described above in the 0°/360° position of FIG. 5. Therefore, in the 45° position, the pistons 56, 58 of cylinders 30, 32, respectively, are both driven outwardly which rotates drive gear 68 clockwise and centerpost shaft 34 counterclockwise.

Comparing FIGS. 5 and 6, it is apparent that the crank arms 60, 62 remain 90° apart while rotating with respect to drive shaft 68. This assures that high torque is maintained throughout the rotation of centerpost shaft 34, since at least one cylinder is operating at all times even when the other is fully extended or retracted, e.g., upper cylinder 30 in FIG. 5. The 90° spacing of crank arms 60, 62 is maintained by operating the cylinders 30, 32 90° out-of-phase with one another. This is accomplished by spacing the upper grooves 98, 100 45° apart along the circumference of valve spool 78 from the lower grooves 106, 108. Since there is a 2:1 ratio between the rotation of drive gear 68 and valve spool 78, a 45° spacing between the upper grooves 98, 100 and lower grooves 106, 108 results in a 90° out-of-phase relationship between the upper cylinder 30, controlled by upper grooves 98, 100, and the lower cylinder 32 controlled by lower grooves 106, 108.

Figure 7:
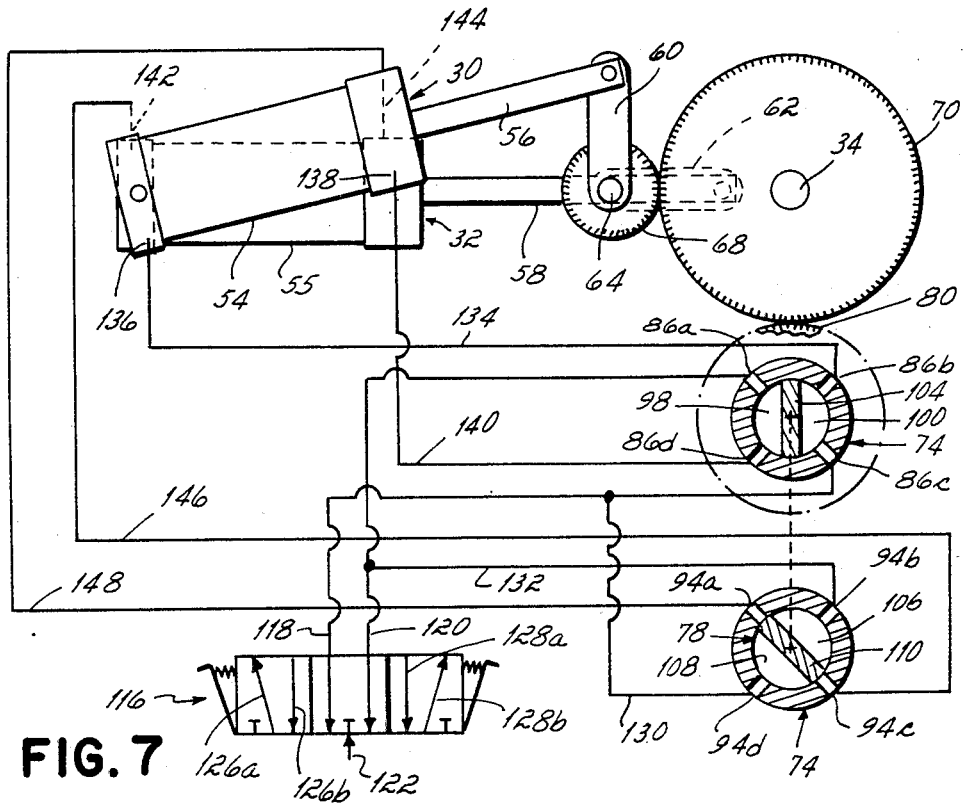
FIG. 7 is a schematic plan view similar to FIG. 5 wherein the crank arm has rotated 90° from its position in FIG. 5.

Referring now to FIG. 7, the valve spool 78 is rotated 45° by follower gear 70 and drive gear 68 as the crank arm 60 assumes a position 90° from its original 0°/360° position of FIG. 5. The upper center section 104 in valve spool 78 has moved clockwise to a position directly between ports 86a, d and ports 86b, c. Therefore, the air flow through ports 86a-d and upper grooves 98, 100 is identical to that described above for FIG. 6. The upper cylinder 30 continues to receive pressurized air at its rearward port 136 to extend piston 56 outwardly for rotating drive gear 68 clockwise and centerpost shaft 34 counterclockwise. The head 57 of piston 56, shown in phantom in FIG. 7, is midway along the cylinder housing 54 in the 90° position of crank arm 60.

As shown in FIG. 7, the piston 58 of lower cylinder 32 is completely extended at the 90° position of crank arm 60. At this point in the operational sequence, the lower center section 110 of valve spool 78 has moved in a blocking position between lower ports 94a, c and between ports 94b, d. Therefore, the air transmitted through line 130 to the lower ports 94a-d is blocked from passing to the lower cylinder 32. All of the torque applied to the drive gear 68 is therefore supplied by the upper cylinder 30. If only the lower cylinder 32 was utilized to actuate drive gear 68, a so-called dead spot would occur at the 90° of FIG. 7 position where lower ports 94a-d are blocked. No dead spot occurs in this invention because upper cylinder 30 continues to operate and rotate drive gear 68.

Figure 8:
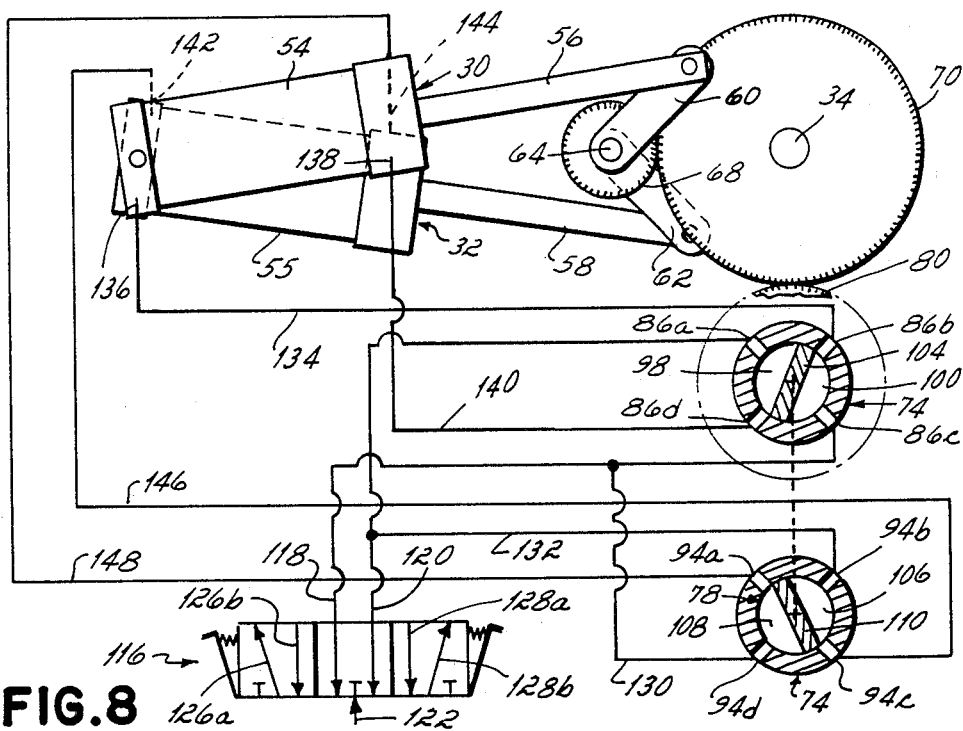
FIG. 8 is a schematic plan view similar to FIG. 5 of the crank arm herein which has been rotated 135° from the position shown in FIG. 5.

Referring now to FIG. 8, the crank arm 60 has rotated 135° from its initial 0°/360° position shown in FIG. 5. In this position, upper groove 98 connects upper ports 86a, d, and upper groove 100 connects upper ports 86b, c, in the same manner as the 45° and 90° positions discussed in connection with FIGS. 6 and 7 above. Therefore, operating fluid continues to be applied to the rearward port 136 of upper cylinder 30 to drive its piston 56 outwardly for counterclockwise rotation of the follower gear 70 and centerpost shaft 34.

At the same time, the piston 58 of lower cylinder 32 begins retracting within its cylinder housing 55 after having been fully extended in the 90° position shown in FIG. 7. In the 135° position, the lower center section 110 no longer blocks lower ports 94a, c but has moved to a position wherein lower groove 108 interconnects ports 94a, d and lower groove 106 interconnects ports 94b, c. Air is therefore transmitted from pressure line 118 through line 130 to lower port 94d, through lower groove 108 to lower port 94a, and then through line 148 to the forward port 144 of lower cylinder 32. Pressure applied at the forward end of the lower cylinder 32 drives its piston 58 inwardly within the cylinder housing 55, in the opposite direction from the movement of piston 58 as described in FIGS. 5–6. Air is exhausted from the lower cylinder 32 through rearward port 142, line 146, through lower groove 106 between ports 94c, b and then through line 132 which connects to the exhaust line 120 to four-way valve 116.

Figure 9:
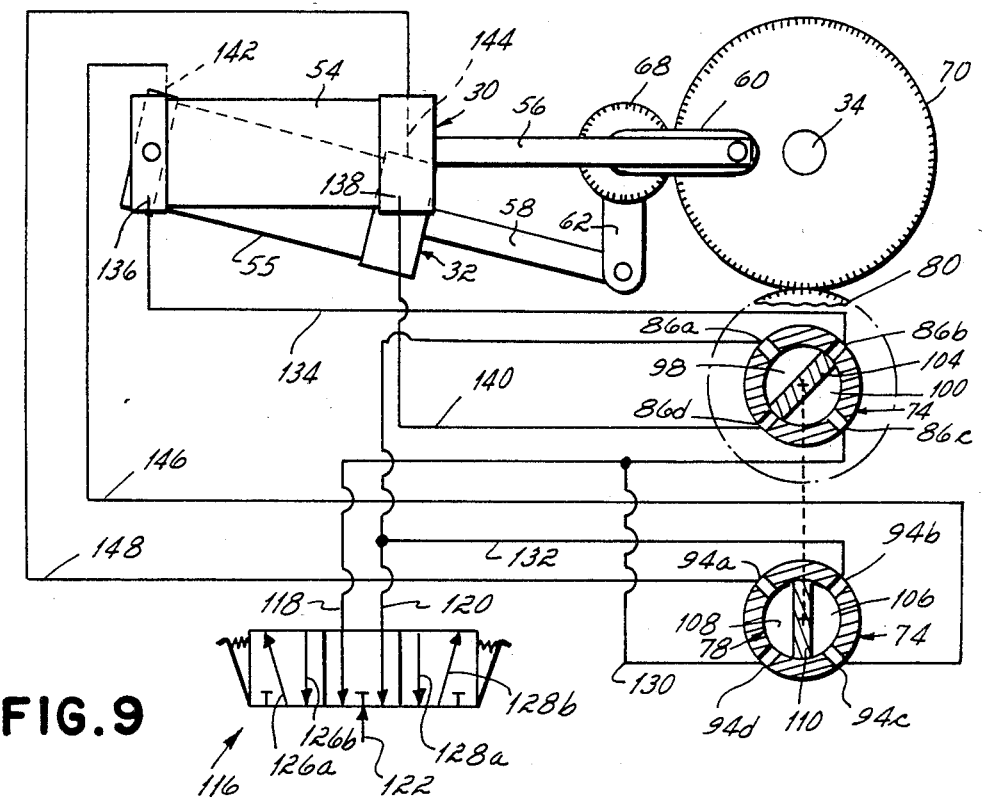
FIG. 9 is a schematic plan view similar to FIG. 5 of the crank arm which has been rotated 180° from the position shown in FIG. 5.

Referring now to FIG. 9, the crank arm 60 is shown 180° from its original 0°/360° position of FIG. 5. In this position, the upper cylinder 30 has now been fully extended with its piston 56 being forced outwardly to the maximum extent. As shown in FIG. 9, the upper center section 104 of valve spool 78 blocks upper ports 86b, d and is disposed between upper ports 86a, c so that no operating fluid from line 118 flows to upper cylinder 30.

At the same time, the lower cylinder 32 is continuously pressurized in the same manner as described above for the 135° position shown in FIG. 8. Whereas the lower cylinder 32 was completely extended at the 90° position of FIG. 7, the upper cylinder 30 is completely extended in the 180° position shown in FIG. 9. Because the cylinders 30, 32 are sequentially operated 90° apart by spool valve controller 36, one of the cylinders 30, 32 is always pressurized throughout the 360° travel of centerpost shaft 34.

The piston 56 of upper cylinder 30 has thus moved from a fully retracted position in FIG. 5, to a fully extended position in FIG. 9, wherein the crank arm 60 and drive gear 68 have moved through 180°. During the same operating period, the valve spool has moved a total of 90°, or one-half the rotation of drive gear 68, from a position wherein upper ports 86a, c are blocked to a position wherein upper ports 86b, d are blocked. Operating air is thus supplied through the flow passages defined by the upper grooves 86a–d of valve spool 78 continuously to the rearward port 136 of cylinder 30 to move its piston 56 from a fully retracted to a fully extended position. In the next 180° of rotation of drive gear 68, and 90° of rotation of valve spool 78 (not shown), operating air is supplied to the forward port 138 of cylinder 30 to move its piston 56 from the fully extended to the fully retracted position. The lower cylinder 32 operates in the identical fashion, except 90° out-of-phase with upper cylinder 30 as explained above.

The sequence illustrated in FIGS. 5–9, in which the position of crank arm 60 and drive gear 68 was described in ascending 45° intervals from the 0°/360° start position to the 180° position, is the sequence for counterclockwise rotation of the centerpost shaft 34. In order to obtain clockwise rotation of centerpost shaft 34, the other side of foot treadle 117 is depressed so that the clockwise control lines 128a, b are shifted within four-way valve 116. For clockwise rotation of centerpost shaft 34, the clockwise control line 128a connects to line 118 making it the exhaust line, and the clockwise control line 128b connects the pressure line 122 to line 120 making line 120 the pressure line. This is the opposite arrangement for the counterclockwise rotation of centerpost shaft 34 described above. In order to obtain clockwise rotation of centerpost shaft 34, the pneumatic cylinders 30, 32 are driven through a descending sequence of angular positions from the 0°/360° starting point. Therefore, the discussion of clockwise rotation begins with FIG. 9 and ends with FIG. 5 in descending order.

Referring to FIG. 9, line 120 is the pressure inlet line and delivers pressurized air directly to upper port 86a, and to lower port 94b through line 132. In the 180° position of valve spool 78 the upper cylinder 30 is fully extended and upper ports 86a–d are blocked. However, air supplied through line 132 flows to lower port 94b, through lower groove 106 to lower port 94c, and then through line 146 to the rearward port 142 of lower cylinder 32. The lower cylinder piston 58 is therefore extended which rotates drive gear 68 in the counterclockwise direction and follower gear 70 and centerpost shaft 34 in the clockwise direction.

Referring now to FIG. 8, clockwise rotation of centerpost shaft 34 continues with the crank arm 60 and drive gear 68 moving to the 135° position. At this point, the upper ports 86a–d are no longer blocked and operating air is directed through line 120 to port 86a, through upper groove 98 to port 86d, and then through line 140 to the forward port 138 of upper cylinder 30. This drives upper cylinder piston 56 rearwardly which rotates the drive gear 68 counterclockwise and centerpost shaft 34 clockwise. Pressurization of the lower cylinder 32 continues in exactly the same fashion as described above for the 180° position in FIG. 9.

Referring now to FIG. 7, the crank arm 60 and drive gear 68 are shown in the 90° position. Upper cylinder 30 continues to be pressurized in the same manner as described in FIG. 8 so as to retract piston 56 and rotate drive gear 68 counterclockwise and centerpost shaft 34 clockwise. In this 90° position, the lower ports 94a–d are blocked by center section 110 so that no air is supplied to lower cylinder 32.

The 45° position of crank arm 60 and drive gear 68 for clockwise rotation of follower gear 70 and centerpost shaft 34 is illustrated in FIG. 6. Pressurization of the under cylinder 30 is identical to that described above for FIGS. 8 and 7. The piston 58 of lower cylinder 32 begins to be retracted within its cylinder housing 55 from its fully extended position shown in FIG. 7. Pressurized air is directed through line 120 into line 132 and then to lower port 94b. From lower port 94b the operating air is directed through lower groove 106 to port 94a, and then out of valve spool 78 through line 148 to the forward port 144 of lower cylinder 32. The lower cylinder piston 58 is therefore driven rearwardly to rotate drive gear 68 counterclockwise and follower gear 70 clockwise. Air is exhausted from lower cylinder 32 through its rearward port 142 through line 146 to port 94c, and then through lower groove 108 through port 94d and out line 130 to exhaust line 118 of four-way valve 116.

The 180° motion of crank arm 60 and drive gear 68 for clockwise rotation of centerpost shaft 34 is completed with their movement to the 0°/360° position shown in FIG. 5. In this position, the upper ports 86a–d are blocked by upper center section 104 so that no air is supplied to upper cylinder 30. The drive gear 68 is continuously rotated, however, by lower cylinder 32 which is pressurized in the identical manner described above for the 45° position shown in FIG. 6.

FIGS. 5–9 illustrate angular positions of cylinders 30, 32 and crank arms 60, 62 at 45° intervals from a 0°/360° start position through 180°, and of valve spool 78 at 22 ½° intervals from a start position through 90°, for both clockwise and counterclockwise rotation of centerpost shaft 34. It should be understood that cylinders 30, 32 continue through a full 360° rotation, and FIGS. 5–9 depict only a half revolution for purposes of illustrating the operation of this invention. The centerpost drive assembly 28 is operable to continuously drive centerpost shaft 34 in either a clockwise or counterclockwise direction with high torque supplied by the sequentially driven cylinders 30, 32.

Referring now to the right hand portion of FIG. 1, the apparatus for breaking the tire bead 19 from wheel 16 is illustrated which forms no part of this invention but is discussed briefly herein to aid in understanding the complete demounting operation. In order to remove tire 18 from wheel 16, the upper and lower beads 19a, b of the tire 18 must first be pushed toward one another away from their bead seats 21a, b, respectively, toward the center of the wheel 16. As described in detail in my co-pending application entitled "Lower Bead Breaker Stroke Control Apparatus", Ser. No. 721300, filed Apr. 9, 1985, the upper and lower tire beads 19a, b are unseated from their bead seats 21a, b in wheel 16 by a lower bead breaker shoe 160 and an upper bead breaker shoe (not shown). The piston (not shown) of a fluid motor 164 is pinned to the lower shoe 160 and its housing rests against a bar 166 which supports a column 168 to which the upper shoe is mounted. Upon actuating the fluid motor 164 by depressing a foot pedal 165 connected to fluid motor 164 by a valve 167, its piston drives the lower shoe 160 upwardly into engagement with the lower tire bead 19b, and at the same time the bar 166 and column 168 are urged downwardly so as to move the upper shoe into engagement with the upper tire bead 19a. The upper and lower bead breaker shoes apply opposing inward forces to the tire beads 19a, b, respectively, so as to urge them toward the center of the wheel 16.

The path along which the lower shoe 160 travels in engaging the lower tire bead 19 and moving it toward the center of wheel 16 is carefully controlled to avoid damage to the wheel 16, while effectively breaking the lower tire bead 19b. The movement of lower shoe 160 is controlled by a regulator assembly 170 which includes a pivot arm 172, regulator arm 174, regulator plate 176 and an adjustment bar 178. As described in detail in my above-identified copending application entitled "Lower Bead Breaker Stroke Control Apparatus", the elements of regulator assembly 170 cooperate to guide the lower shoe 160 over the outer flange of the wheel 16 into engagement with the lower tire bead 19b and the bead seat 21b without exerting excessive pressure on the wheel 16. A vertical stroke limiter assembly 180 is also provided which is operable to lock-out vertical movement of the lower bead breaker shoe 160, if desired. Reference should be made to my co-pending application for a detailed description of the operation of regulator assembly 170, which is incorporated by reference herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the gear arrangement for transmitting the reciprocal motion of the cylinder pistons 56, 58 to the centerpost shaft 34, including drive gear 68, follower gear 70, and spool drive gear 80, could be replaced by other types of motion transmitting means such as pulleys and belts, or chains and sprockets. Although the upper and lower cylinders 30, 32 were described as pneumatically operated, it is contemplated that they could be powered by other fluid mediums such as hydraulic fluid or steam. In addition, if rotation of the centerpost 12 in only a single direction was desired, the four-way valve 116 could be replaced with a commercially available two-way valve. Of course, while the operation of drive assembly 28 was described primarily with reference to a tire demounting operation, it is also applicable for use in a mounting operation. Moreover, the grooves 98, 100 and 106, 108 formed in the valve spool 78 could be replaced with through bores for interconnecting the ports 86a–d and 94a–d, respectively.

Therefore, it is intended that the invention not be limited to the particular embodiment disclosed as the best mode contemplated for carrying out this invention, but that the invention will include all embodiments falling within the scope of the appended claims.

What is claimed is:

1. In a tire changing machine having a rotatable centerpost shaft adapted to mount a tire and wheel, a drive assembly for rotating the centerpost shaft for mounting and demounting of the tire from the wheel comprising:
a plurality of fluid motors;
means for drivingly connecting said fluid motors to said centerpost shaft;
a valve body formed with a plurality of sets of ports, said ports in each of said sets being spaced about the perimeter of said valve body, each of said sets of ports being axially spaced along said valve body from one another;
a valve spool rotatable within said valve body, said valve spool being formed with a plurality of axially spaced flow passage means, each of said flow passage means being disposed in fluid communication with one of said sets of ports in said valve body for interconnecting said ports in each of said sets;
means for directing operating fluid to said sets of ports in said valve body;
fluid line means for directing operating fluid from said sets of ports in said valve body to said fluid motors;
means drivingly connecting said valve spool to said centerpost shaft for rotating said valve spool within said valve body, said valve spool being operable to control the flow of operating fluid through said fluid line means to said fluid motors for sequentially driving said fluid motors to rotate said centerpost shaft.

2. The drive assembly of claim 1 in which said valve spool includes an exterior wall, said flow passage means being axially spaced grooves formed in said exterior wall of said valve spool.

3. The drive assembly of claim 1 in which said valve spool includes an exterior wall, said flow passage means are upper and lower grooves axially spaced along said exterior wall of said valve spool, said upper grooves being spaced 45° apart from said lower grooves about the perimeter of said exterior wall of said valve spool.

4. The drive assembly of claim 1 in which said fluid means for directing operating fluid to said sets of ports in said valve body is a directional control valve.

5. The drive assembly of claim 1 in which said means for drivingly connecting said fluid motors to said centerpost shaft comprises:
a rotatable crank shaft;
a drive gear mounted to said crank shaft;
a crank arm connecting each of said fluid motors to said crank shaft for rotating said crank shaft and said drive gear; and
a follower gear mounted to said centerpost shaft, said follower gear being drivingly connected to said drive gear for rotation therewith.

6. The drive assembly of claim 5 in which said fluid motors each include a cylinder housing and a piston adapted to reciprocate within said cylinder housing, said crank arms each being pivotally connected to said pistons of said fluid and movable through 360° relative to the longitudinal axis of said crank shaft, said fluid motors being driven in timed sequence such that said crank arm of one of said fluid motors is spaced 90° apart from said crank arm of the other of said fluid motors relative to said crank shaft.

7. The drive assembly of claim 5 in which said means drivingly connecting said valve spool to said centerpost shaft comprises a spool drive gear mounted to said valve spool, said spool drive gear being drivingly connected to said follower gear.

8. The drive assembly of claim 7 in which said diameter of said spool drive gear is twice the diameter of said drive gear, said valve spool thereby rotating one revolution for every two revolutions of said crank shaft.

9. In a tire changing machine having a rotatable centerpost shaft adapted to mount a tire and wheel, a drive assembly for rotating the centerpost shaft for mounting and demounting of the tire from the wheel comprising:
two fluid motors;
means for drivingly connecting said fluid motors to said centerpost shaft;
a valve body formed with a first set of ports and a second set of ports, said second set of ports being axially spaced along said valve body from said first set, said ports in each of said first and second sets being spaced about the circumference of said valve body, said ports in said first set being disposed in alignment with said ports in said second set;
a valve spool rotatable within said valve body, said valve spool having an exterior wall formed with first flow passage means and second flow passage means, said second flow passage means being axially spaced along said valve spool from said first flow passage means, said first flow passage means being disposed in fluid communication with said first set of ports in said valve body, and said second flow passage means being disposed in fluid communication with said second set of ports in said valve body;
means for directing operating fluid to said first and second set of ports;
fluid line means for directing operating fluid from said first set of ports to one of said fluid motors, and from said second set of ports to the other of said fluid motors;
means drivingly connecting said valve spool to said centerpost shaft for rotating said valve spool within said valve body, said valve spool being operable to control the flow of operating fluid from said first and second set of ports through said fluid line means to said fluid motors for sequentially driving said fluid motors to rotate said centerpost shaft.

10. The drive assembly of claim 9 in which said first set of ports includes four ports spaced 90° apart about the circumference of said valve body.

11. The drive assembly of claim 9 in which said second set of ports includes four ports spaced 90° apart about the circumference of said valve body.

12. The drive assembly of claim 9 in which said first flow passage means includes two grooves formed in said exterior wall of said valve spool, said grooves extending radially inwardly from said exterior wall and forming a continuous center section therebetween.

13. The drive assembly of claim 12 in which said second flow passage means includes two grooves formed in said exterior wall of said valve, said grooves being spaced 45° from said grooves of said first flow passage means about the circumference of said valve spool, said grooves extending radially inwardly from said exterior wall and forming a continuous center section therebetween.

14. A drive assembly for rotating a shaft comprising:
a plurality of fluid motors;
means for drivingly connecting said fluid motors to said shaft;
a valve body formed with a plurality of sets of ports, said ports in each of said sets being spaced about the perimeter of said valve body, each of said sets of ports being axially spaced along said valve body from one another;
a valve spool rotatable within said valve body, said valve spool being formed with a plurality of axially spaced flow passage means, each of said flow passage means being disposed in fluid communication with one of said sets of ports in said valve body for interconnecting said ports in each of said sets;
fluid line means for directing operating fluid from said sets of ports in said valve body to said fluid motors;
means drivingly connecting said valve spool to said shaft for rotating said valve spool within said valve body, said valve spool being operable to control the flow of operating fluid through said fluid line means to said fluid motors for sequentially driving said fluid motors to rotate said centerpost.

* * * * *